United States Patent [19]

Doyle

[11] 3,838,464

[45] Sept. 24, 1974

[54] RETAINING RING FOR MAGNETIC DISC PACK ASSEMBLY

[75] Inventor: Daniel C. Doyle, Nashua, N.H.

[73] Assignee: Nashua Corporation, Nashua, N.H.

[22] Filed: Oct. 24, 1972

[21] Appl. No.: 300,160

[52] U.S. Cl. .................... 360/137, 74/573, 360/133
[51] Int. Cl. .................... G11b 25/00
[58] Field of Search ......... 274/4 H, 4 J, 39 R, 39 A; 340/174.1; 346/137; 74/573

[56] References Cited

UNITED STATES PATENTS

| | | | |
|---|---|---|---|
| 861,463 | 1/1907 | Hyde | 74/573 |
| 1,949,478 | 3/1934 | Kindelmann et al. | 74/573 |
| 3,587,073 | 6/1971 | Ghose | 340/174.1 C |
| 3,633,186 | 1/1972 | Lynott | 340/174.1 C |

*Primary Examiner*—Vincent P. Canney
*Attorney, Agent, or Firm*—Kenway & Jenney

[57] ABSTRACT

An improved annular retaining ring in a rotating disc pack assembly of a magnetic disc memory system. A plurality of cavities for counterbalance weights are provided in a uniform angular distribution about the center point of the retaining ring. The cavities are inset from the outer boundary in a top surface of the retaining ring so that all spatial points within the cavities are a lesser distance from the center of the ring than any point included in the outer boundary of the top surface. Counterbalance weights are inserted in the appropriate ones of the cavities to offset otherwise present unbalanced moments about the axis of rotation and minimize dynamic instability in the rotating disc pack assembly.

5 Claims, 3 Drawing Figures

RETAINING RING FOR MAGNETIC DISC PACK ASSEMBLY

BACKGROUND OF THE INVENTION

This invention relates to digital computers and more particularly to magnetic disc memory systems.

It is well known in the art to provide a digital computer with a memory system comprising a plurality of rotating magnetic discs positioned appropriately with respect to a fixed set of magnetic recording and playback heads. It is further known in the art to package a plurality of such magnetic discs, for example, ten discs, to form a disc pack memory assembly for installation in a disc memory system. Commonly used methods of manufacture for such disc assemblies and component parts thereof introduce dynamic instabilities in the rotating magnetic disc assemblies because of unbalanced moments about the axis of rotation caused by relatively minor irregularities in the construction. These inherent dynamic instabilities may be responsible for the occurrence of substantial numbers of errors in the digital signal processing accomplished by the computer system. In order to provide optimum performance for a computer system, such dynamic instabilities of the rotating disc assemblies in the memory system must be substantially reduced. A first method of reducing these instabilities, known in the prior art, requires that the manufacture of the disc assembly be performed using highly precision methods, consequently requiring a substantial expense. A second more prevalent method in the art provides that counterbalance weights be attached to the outer perimeter of a retaining ring in the disc assembly in such a manner so as to counterbalance any previously unbalanced moments about the axis of rotation in the assembly. This latter method is commonly performed by clamping the necessary counterbalance weights to the outer rim of a retaining ring in the assembly. Although this method is generally effective to eliminate the dynamic instabilities of a disc memory, a substantial disadvantage of this method is easily seen following the accidental disengagement of a counterbalance weight from the rotating disc assembly. Upon such disengagement, a counterbalance weight generally creates a subsantial amount of damage to the assembly and more particularly to the precision and highly expensive record and playback magnetic heads.

SUMMARY OF THE INVENTION

Accordingly, it is among the objects of this invention to provide a new and improved magnetic memory disc pack assembly for a digital computer.

Another object is to provide a new and improved annular retaining ring for a dynamically counterbalanced magnetic memory disc pack assembly.

In accordance with an embodiment of the invention, an annular retaining ring for a magnetic memory disc assembly provides a plurality of cast in or milled cavities for the insertion of counterbalance weights. The cavities are positioned at such locations in the retaining ring such that the centrifugal force generated by the rotation of the disc pack assembly and exerted on the counterbalance weights inserted in the cavities is completely offset by the centripetal force exerted on the inserted weights as applied by the walls of the cavities in the retaining ring of the rotating disc pack assembly. In such a configuration, due to the balance of the centrifugal and centripetal forces applied to the counterbalance weights inserted in the cavities of the retaining ring, those weights may in no way disengage from the disc pack assembly during rotation and subsequently damage other components of the disc memory system.

In other embodiments, modified forms of the invention may be used.

BRIEF DESCRIPTION OF THE DRAWINGS

The foregoing and other objects of this invention, the various features thereof, as well as the invention itself may be more fully understood from the following description when read together with the accompanying drawings, in which.

DESCRIPTION OF THE PREFERRED EMBODIMENT

Figure 1:
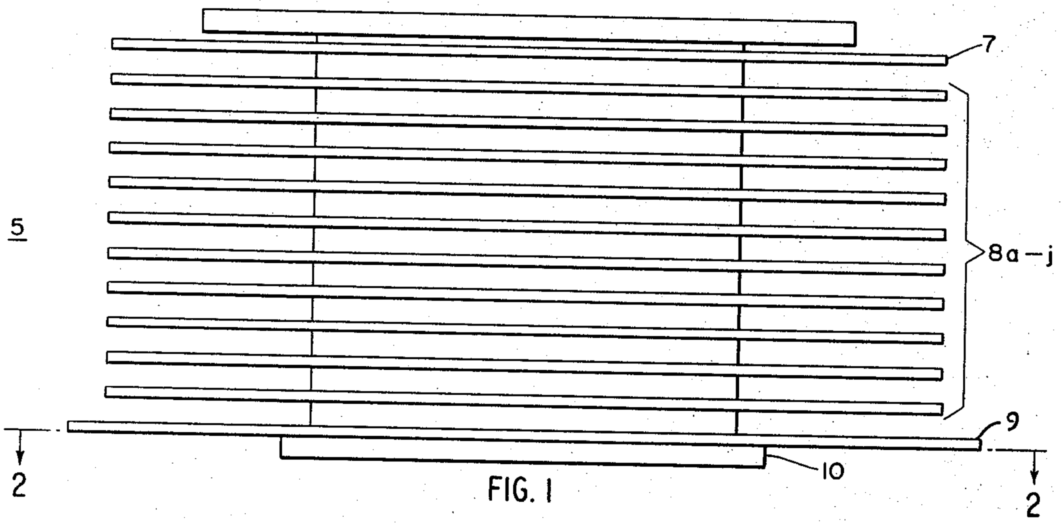
FIG. 1 illustrates a side view of a disc memory assembly embodying the invention.
Figure 2:
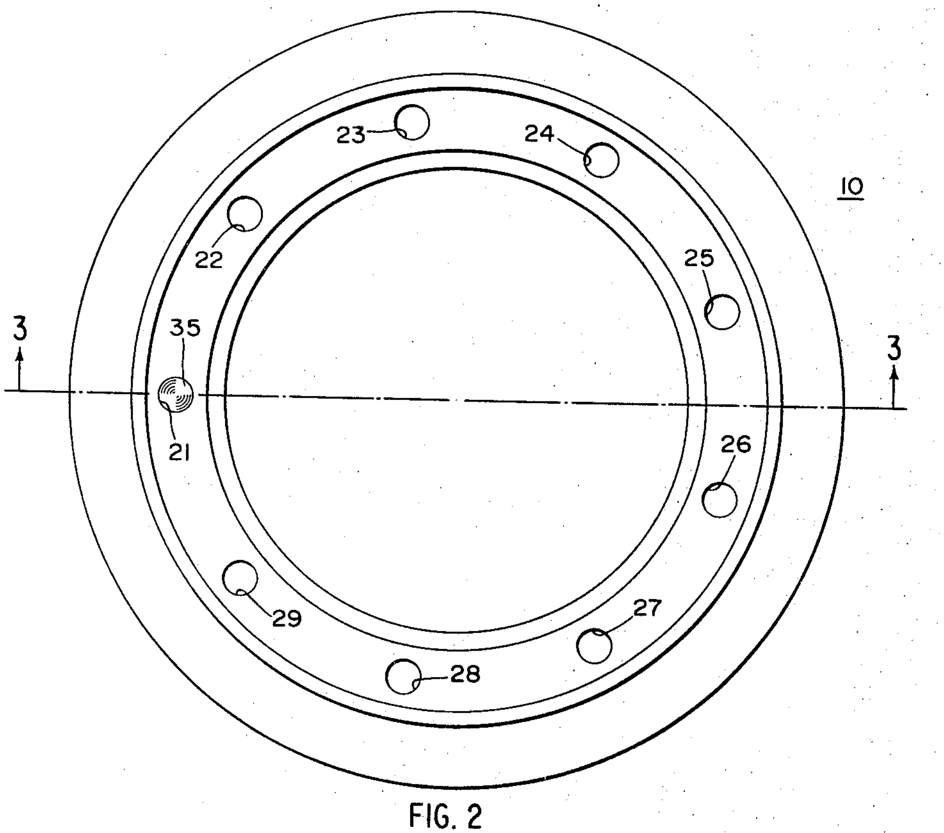
FIG. 2 illustrates a top view of a disc memory assembly retaining ring of FIG. 1 along section 2—2.
Figure 3:
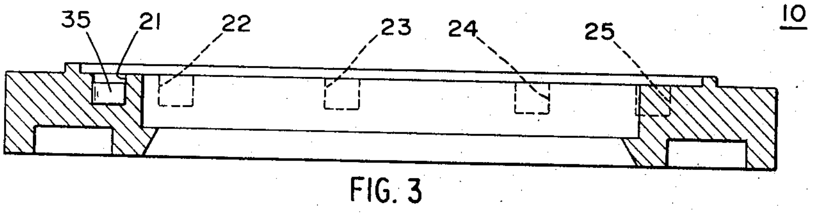
FIG. 3 illustrates an indicated cross-section of the retaining ring of FIG. 2 along section 3—3.

An embodiment of the instant invention is described hereinbelow with reference to FIGS. 1 through 3. FIG. 1 shows an exemplary disc pack assembly 5, having top protective disc 7, ten recording discs 8*a–j*, bottom protective disc 9 and retainer ring 10. Annular retainer ring 10 may be constructed of a die cast aluminum alloy for use in such a disc pack assembly, for example, as in an IBM 4436 Disc Quad Pack. In the present embodiment, ring 10 is used as a structural component in the standard fashion in such a disc pack except as respecting the dynamic balancing of the assembly. In the prior art, the dynamic instability in the rotating disc assembly produced by structural irregularities of the component portions of the assembly have been reduced by the attachment to the outer rim of the assembly retaining ring of appropriately located counterbalance weights so that the net unbalanced moment about the axis of rotation was minimized. This method suffered a substantial drawback in that the accidental disengagement from the ring of the one of the attached counterbalance weights was highly likely to cause extensive damage to the precision magnetic recording and playback heads in the memory system.

In the instant invention, an annular retaining ring provides substantially the same structural function as such a ring provides in the prior art system. However, in order to balance the disc assembly, a plurality of cavities are either milled or cast in the ring for the insertion of the appropriate counterbalance weight to offset weight distribution irregularities in the disc pack assembly. The cavities are uniformly distributed about the center point of ring and positioned on a top surface in such a manner that the cavities are inset from the outer boundary of that top surface. In this manner, the cavities are positioned such that the distance from the point in each cavity farthest from the center point of the ring is less than the distance from the point in the outer boundary of the top surface nearest to the center point of the ring. FIGS. 2 and 3 show in detail an improved retaining ring 10 wherein nine such cavities 21–29 are used to provide locations for the appropriate counterbalance weights.

In other embodiments, other configurations of cavities may be used. For example, a greater or lesser number of cavities may be provided. The cavities may also be other than cylindrical in shape to accomodate weights of a desired shape. As a further example, the cavities might be positioned in the top surface of the retaining ring so as to include the inner boundary of the top surface. The cavities of this latter example might also be of such number and shape that the cavities might overlap to form a single continuous cavity including the epicycloidal inner boundary of the top surface of the ring.

In the hereindescribed embodiment, a determination is made from a fully assembled disc package as to the precise weight which must be located in the particular ones of the cavities 21–29. Upon placement of the determined weights in the appropriate ones of the cavities, the weight distribution irregularities of the assembled components of the package are counterbalanced. In this manner, the dynamic instabilities of the rotating disc pack assembly are minimized. FIGS. 2 and 3 show by way of example, a single weight 35 in cavity 21 of ring 10 required to dynamically balance a disc assembly.

In operation, retaining ring 10 rotates together with the disc pack assembly in the memory system. Whereas in the prior art there was the danger that a counterbalance weight attached to the retaining ring might disengage from said ring, that danger is completely eliminated in the improved ring 10 in accordance with the instant invention. The centrifugal force resulting from the rotation which is applied to counterbalance weight 35, is totally balanced by the centripetal force on weight 35 from ring 10 as applied by the outermost boundary walls of cavity 21 in ring 10. Thus, the counterbalance weight 35 has a zero net force applied in the radial direction of the retaining ring. The net force on weight 35 in the vertical direction is also zero due to the balancing of the gravitation force as offset by the supporting force from ring 10 as applied by the base wall of cavity 21. In addition, ring 10 is positioned in the present embodiment in disc pack assembly 5 (FIG. 1) so that the top surface of ring 10 is flush with the lower surface of bottom protective disc 9, thereby providing a cover surface to cavities 21–29. Thus, for example, even in a case where a vertical upward force is applied to counterbalance weight 35 in cavity 21, that force will be offset by an equal force applied by disc 9 so that weight 35 cannot disengage from cavity 21 in ring 10.

The only unbalanced force on weight 35 is that applied by ring 10 via the walls of cavity 21 in the direction of rotation. As a result, counterbalance weight 35 rotates with the disc pack assembly and remains at a stable equilibrium in cavity 21, with no danger of that weight disengaging from the retaining ring 10 and damaging other components in the memory system.

In other embodiments, other forms of the invention may be used.

I claim:

1. An improved annular retaining ring in a disc pack assembly of a magnetic disc memory system, said improvement comprising a plurality of cavities in said annular ring, said cavities being positioned in a uniform angular distribution about the center point of said ring, said cavities being further positioned in a top surface of said ring, said cavities being still further positioned in said top surface whereby the distance from the point in each of said cavities farthest from said center point of said ring is less than the distance from the outer boundary point in said top surface nearest to said center point of said ring.

2. The improved annular retaining ring of claim 1, said improvement further comprising a plurality of counterbalance weights, the respective ones of said weights being positioned in predetermined ones of said cavities.

3. The improved annular retaining ring of claim 1, wherein said retaining ring is cast and said cavities are cast therein.

4. The improved annular retaining ring of claim 1, wherein said retaining ring is cast and said cavities are milled therein.

5. In a disc pack assembly having a retainer ring situated at the bottom of the pack, the improvement comprising a plurality of cavities in said annular ring, said cavities being positioned in a uniform angular distribution about the center point of said ring, said cavities being further positioned in a top surface of said ring, said cavities being still further positioned in said top surface whereby the distance from the point in each of said cavities farthest from said center point of said ring is less than the distance from the outer boundary point in said top surface nearest to said center point of said ring, and a counterbalance weight situated in at least one of said cavities.

* * * * *